Aug. 7, 1928.

G. A. OVERSTROM 1,679,739

PROCESS FOR PYROELECTRIC SEPARATION OF FINELY DIVIDED MATERIALS

Filed Nov. 24, 1925  3 Sheets-Sheet 1

INVENTOR.
Gustav A. Overstrom

BY Arthur P. Knight

ATTORNEY.

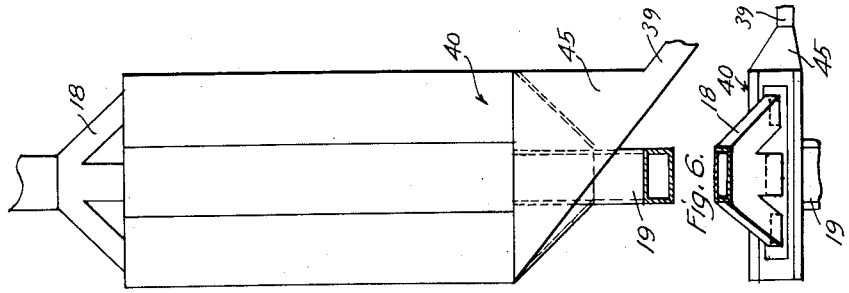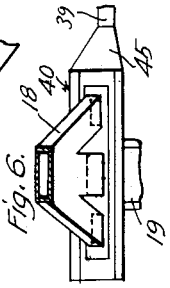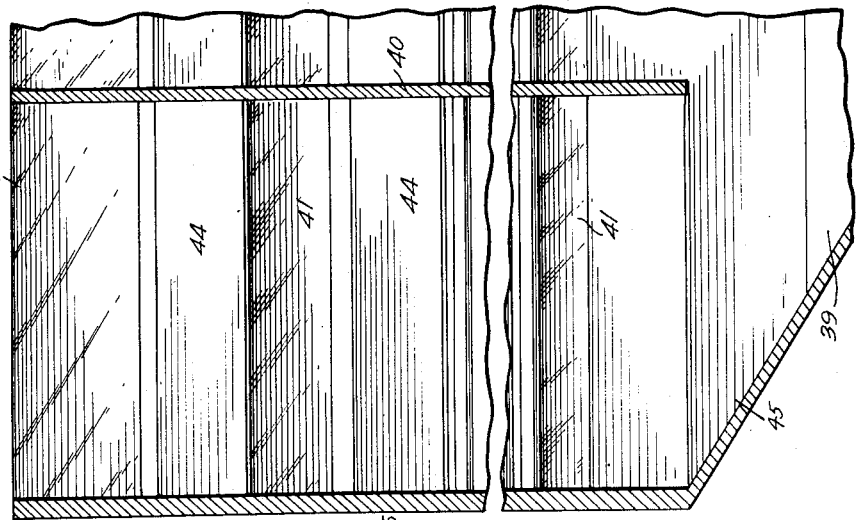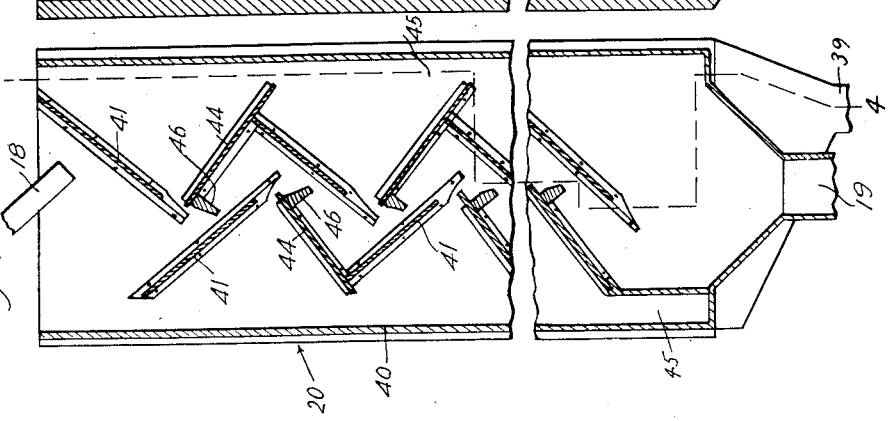

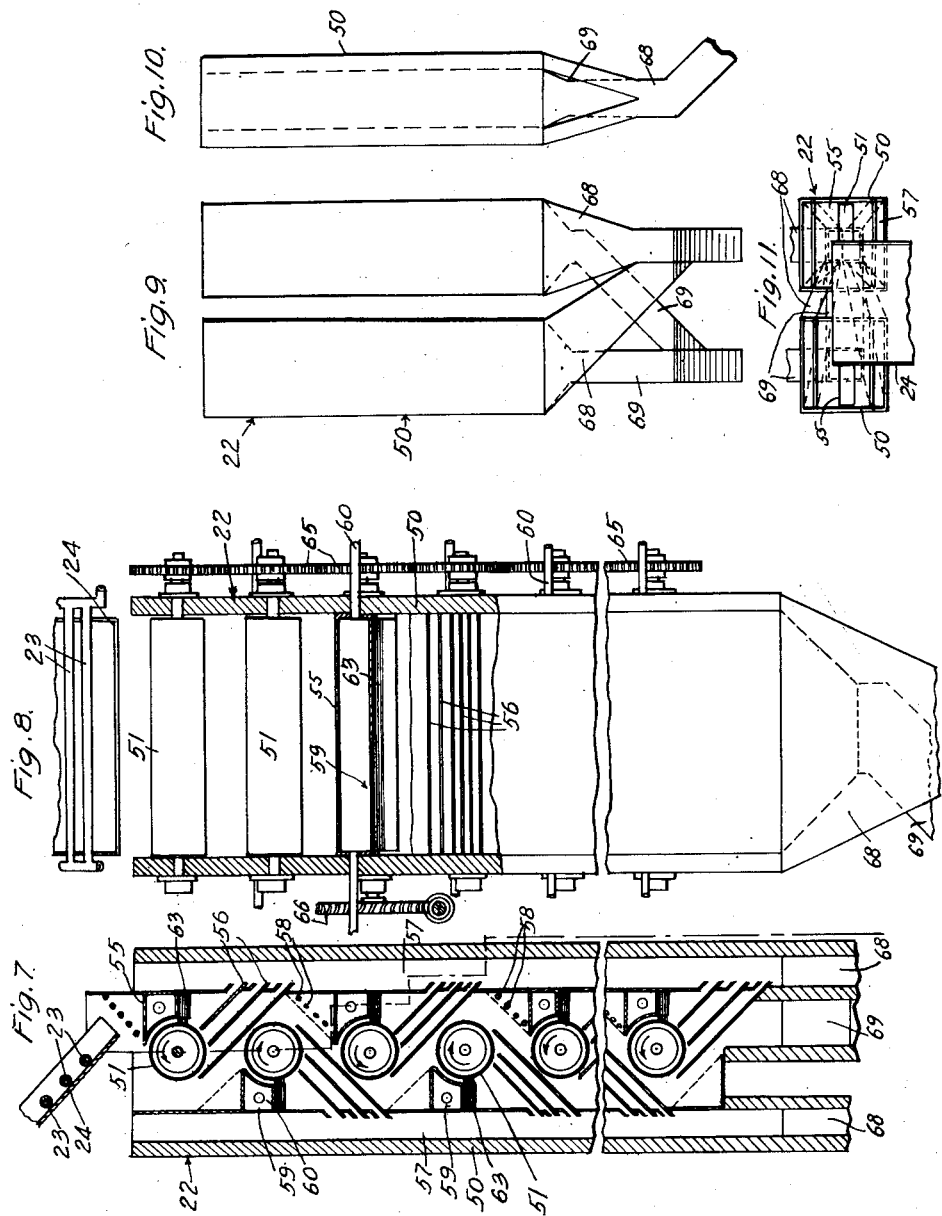

Patented Aug. 7, 1928.

1,679,739

UNITED STATES PATENT OFFICE.

GUSTAV A. OVERSTROM, OF PACIFIC GROVE, CALIFORNIA.

PROCESS FOR PYROELECTRIC SEPARATION OF FINELY-DIVIDED MATERIALS.

Application filed November 24, 1925. Serial No. 71,212.

This invention relates to a process and apparatus for separation of finely divided materials which are of such nature that they can not be readily separated by screening, tabling, jigging or other means depending upon difference in size or specific gravity of the product. An important object of the present invention is to provide for the separation of such materials without the use of expensive apparatus such as is now required in separators of the so-called electrostatic separator type, in which means have to be provided for producing and maintaining a high potential electrostatic field, requiring considerable expense to install and maintain.

I have discovered that certain mixtures of finely divided materials can be effectively separated by pyro-electrical action due to electrification developed in the materials by the action of heat with or without agitation, and without the application of any electrification from an external source, and my process as hereinafter described is based on this discovery.

My invention comprises means for subjecting the finely divided material to certain operations whereby electrification of the material is effected without the application of an externally applied electrical field and causing the particles so electrified to become separated from one another by means of such electrification. I have used various means for producing the required electrification, namely, heating or successive heating and cooling of the material and in some cases, agitation, as hereinafter set forth. I have also found that the process can be most effectively carried out when the material is in a substantially dry condition and such drying may be effected by heating the material to a desired temperature in any suitable drier.

When the material has been electrified as stated, that is to say, without the application of externally generated electricity the constituents of the material are or may be selectively separated by causing the material to pass in a stream in contact with or in proximity to a separating surface, either stationary or movable, to which certain of the constituents of the material adhere by reason of their electrification while other constituents of the material do not adhere and are consequently separated from the material adhering to such surface. The material adhering to the surface may be collected and removed from time to time or continuously by moving the surface or by operation of cleaning, or stripping means as hereinafter described.

I have found that my process is especially adaptable to separation of certain materials having special properties in respect to development of electrification therein by action of heat and particularly I have found my process to be especially advantageous when applied to separation of materials having pyroelectric properties from materials which are devoid of such properties or are relatively less pyroelectric. In certain cases I have found my process is especially applicable to the separation of mica and feldspar from quartz or silica sand containing such impurities, so as to produce on one hand a silica sand which is comparatively pure and on the other hand a product which is comparatively rich in feldspar and to produce both of such products relatively free from mica. My process is however generally applicable to separation of constituents of more or less finely divided material where such constituents have different pyroelectric properties or otherwise differ in their tendencies to electrification by action of heat.

I have also found that the nature of the separator body or surface over which the material is passed also has a controlling effect on the separating action and that the separating action can be made most efficient by using the most suitable material for the separator body.

The accompanying drawings illustrate my invention and referring thereto:

Fig. 3 is a vertical section of one form of separating apparatus for performing the actual separating operation in the installation above described.

Fig. 4 is a section on line 4—4 in Fig. 3, with parts broken away.

Fig. 5 is a side elevation of said apparatus.

Fig. 6 is a plan view thereof.

Fig. 7 is a vertical section of another separating device which may be used in connection with the apparatus shown in Figs. 1 and 2.

Fig. 8 is a partly sectional side elevation of the separating apparatus shown in Fig. 7.

Fig. 9 is a side elevation of a separating apparatus of which one of the units is shown in Figs. 7 and 8.

Fig. 10 is an end elevation of the apparatus shown in Fig. 9.

Fig. 11 is a plan view thereof.

Figure 1:
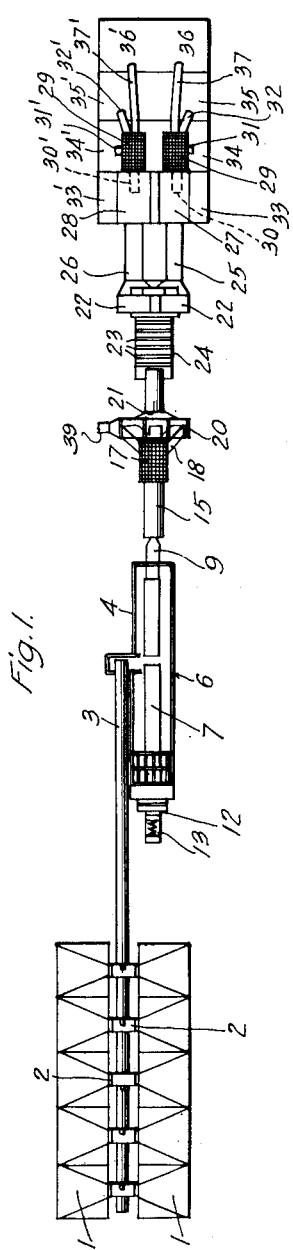
Fig. 1 is a plan of the complete installation for treatment of sand or like material to separate the same into its constituents as hereinafter described.
Figure 2:
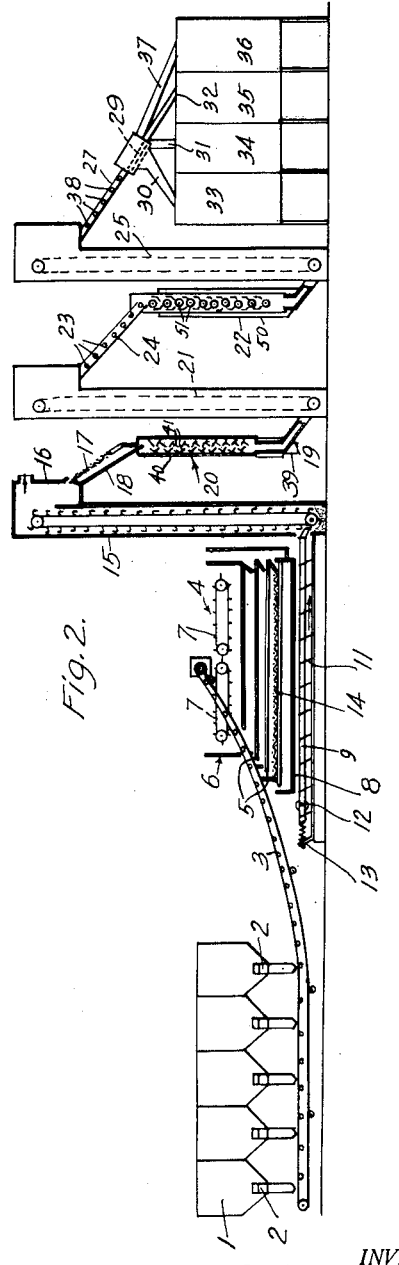
Fig. 2 is a side elevation partly in section of the apparatus shown in Fig. 1.

The apparatus shown in Figs. 1 and 2 comprises storage bins 1 for the sand or raw material to be operated upon, provided with gates or discharge means 2 for delivering the material to a suitable conveyor 3 whereby the same is transported to a suitable dryer indicated at 4. Said dryer may be of any suitable type but I have used sucessfully the type shown in the drawings comprising a series of steam heated pipes 5 arranged at different levels, one above another within a suitable casing 6, means being provided such as indicated at 7 for distributing over said pipes the material delivered by the conveyer 3. The bottom 8 of the casing 6 is perforated or slotted as shown to permit discharge of the dried material onto a conveyer 9. A screen 14 is preferably located above the lowermost set of heating pipes 5. Said conveyer may be of any suitable construction but is preferably of the reciprocating or shaking type, being for example formed as a table or apron carried by inclined resilient legs 11 and reciprocated in any suitable manner, for example by unbalanced pulley means indicated at 12 acting in cooperation with a resilient bumper indicated at 13 so as to provide the reciprocating movement of the table and continually advance the material thereon in the direction indicated by the arrow.

At the discharge end of the conveyer 9 is located an elevator 15 which is adapted to lift the material to a feed box 16 from whence it passes over a chip screen 17 below which is provided a chute 18 which delivers the material to a separator 20, preferably of the type shown in Figs. 3 to 6. Another elevator 21 is shown as adapted to receive the material from the discharge chute 19 of separator 20 and to deliver it to a second separator 22 which may be of the type shown in Figs. 7 to 11 inclusive. A temperature controlling means consisting for example of a series of steam heated pipes 23, which may be heated by steam or cooled by water or otherwise controlled as to temperature, may be located in the path of the material passing from the top of elevator 21 to the separator 22, said pipes being located for example on or above the floor of a chute 24 for conducting the material from the elevator 21 to the separator 22.

Elevator means may be provided for receiving the separated constituents from the separator 22 and delivering the same to suitable receiving means. In the case of the material for which the apparatus shown in these figures are especially designed there are two separately recovered constituents of value and I have for that reason provided two elevators 25 and 26 located side by side and adapted to receive respectively the two constituents separated by the means 22 aforesaid, suitable cross-spouts 68 and 69 being provided for that purpose. Said two elevators 25 and 26 deliver the respective constituents through chutes 27 and 28 to classifying screens 29 from which chutes 30, 31, and 32 or 30', 31', and 32' lead to respective storage bins 33, 34, and 35, or 33', 34', and 35' as the case may be, an additional storage bin 36 or 36' being provided to receive the oversize from the said screening apparatus, said oversize being delivered thereto through chute 37 or 37'. It is desirable to provide cooling means such for example as water cooled pipes 38 in the chutes 27 and 28 leading from the respective elevators 25 and 26 to the storage means aforesaid, so as to cool the materials sufficiently to permit screening.

The actual electrical separation is performed according to my invention in apparatus which is adapted to bring the electrified material into contact with a member or surface and to cause the material to travel over said member or surface in such manner that certain of the constituents of the material will adhere to a portion of the member or surface while other constituents will pass away therefrom so as to effect the separation. I have found that in some cases the material which is caused to adhere to the separator member or surface may eventually be removed therefrom by the action of gravity but in other cases it is necessary to forcibly remove the material from said separating member by brushing, scraping, or otherwise. Figs. 3 to 6 show a form of separator which is adapted to operate without the use of special brushing or scraping means for removing the separated material, such separator being especially adapted for use as the separator 20 of Figs. 1 and 2. Said separator comprises a casing or tower 40 and a series of reversely inclined separator plates 41 mounted therein one above another and so arranged that material deposited on the uppermost plate from the supply chute 18 will travel down on this uppermost plate and will fall successively from each plate 41 to the next, such material as is not separated being finally discharged through a chute 19. Below each separator plate 41 is arranged a skimmer plate or member 44, which is inclined downwardly and outwardly so as to cause material falling from the under side of each separator plate on to the subjacent skimmer plate to travel downwardly and outwardly on the skimmer plate into a discharge chute 45 located at each side of the vertical series of separator plates. Each skimmer plate may also be provided with a deflector 46 adapted to guide material falling off the top of the overlying separator plate onto the next lower separator plate. The operation of this separator will be described hereinafter in connection with the operation of the complete apparatus but it may be stated here that the operation of this form of separator is dependent upon the fact that when the electrified material passes over any of the separator plates 41 a constituent of such material is caused by the electrical action to pass around the lower end of the plate away from the stream of material falling onto the next plate and eventually falls by gravity onto the skimmer where it is separated from the rest of the material being treated.

In those cases where it is necessary to remove the separated material from the separating member by brushing or scraping means or the like, a construction such as shown in Figs. 7 to 11 may be adopted, said construction comprising a casing or tower 50, a series of horizontal separator cylinders or rollers 51 which may be of insulating material, namely, glass as hereinafter described mounted within said casing one above another, a feed chute 24 for supplying material to the top of the apparatus, a shelf or material support 55 located above each separating cylinder or roller and adapted to receive the material and allow it to pass downwardly onto the top of the corresponding separator cylinder, and discharge chutes or deflectors 56 located below each separator cylinder or roller and adapted to deliver separated material into vertical chutes 57 extending at each side of the vertical series of rollers or cylinders 51. Temperature regulating means consisting for example of pipes 58 may be provided above some or all of the material supports 55 so as to maintain the material at the proper temperature either by heating or cooling the same as may be required and temperature controlling means 59 may be provided for each roller, the same consisting for example of metal boxes arranged adjacent to the rollers and provided with means 60 for circulating heating or cooling fluid therethrough. In case heating is desired for the temperature controlling members this may be effected by supplying steam to said members and in case cooling is desired, cooling water or other cooling medium at suitable temperature may be circulated through said members. In order to increase the capacity of the apparatus I have shown in Figs. 1, 2, 9, 10, and 11 a plurality of separators of this type mounted side by side, which are cross-spouted as shown so as to deliver the material of one kind from all the separators to one elevator 25 and all of the material of another kind from all the separators to another elevator 26. Brushing or scraping means indicated at 63 and consisting for example of felt are provided for each separator roller 51, adapted to remove from said separator roller or cylinder any material which has not already fallen therefrom. The respective rollers or cylinders 51 are geared together, so as to be operated in unison, by gearing indicated at 65, and are driven by driving gearing 66 in any suitable manner, the gearing being so arranged as to drive successive cylinders or rollers in opposite directions, as indicated by the arrows. The direction of rotation of each cylinder is preferably such that the material passing over the same moves in the same direction as the surface of the cylinder.

For quartz separation with quartz adhering to the roller the material to be separated may run against the rotation of and in actual contact with the roller and still good results obtained, but for mica separation best results are obtained when the stream of sand runs with the rotation and just barely away from contact with the roller. The mechanical brushing action that the sand would have on the mica adhering to the roller is avoided if no actual contact is established, but the sand stream must run as close to the roller as possible in order that the necessary temperature opposition between roller and sand is not defeated. For quartz separation actual contact is desirable, in fact almost necessary, as it would be impractical to cool a large mass of running sand without actual contact.

I will describe the operation of my process as applied to the treatment of a certain variety of sand for separation of the constituents thereof, namely, what is known as Oceanside sand obtained near Oceanside, San Diego County, California, and containing about 80% quartz, 18% felspar, 2% mica, lime, magnesia, etc. Including the silica in the feldspar the sand assays about 92% silica. This is too low in silica for glass making and too high in silica for pottery or similar ware and the object of my process as applied to such a sand is to separate the sand into a constituent relatively high in silica (95 to 96%), suitable for glass making, and another product containing about 88 to 89% silica, suitable for porcelain and sanitary wares, and also to obtain both of these products substantially free from mica.

The material is supplied from the storage bins 1 to the conveyor 3 which delivers it to the drying means 4, wherein it is subjected to the drying action of steam coils or other suitable apparatus so as to condition it for the electrical separation as well as for the market demand for dry sand, this drying operation being an important primary stage in the operation since the production and retention of electrification of the material is dependent upon the same being dry or free from superficial or absorbed moisture which would tend to immediately discharge any electrification thereon. The steam coils or steam heating means in the dryer are preferably maintained at a temperature of about 210° F. for the material above referred to so that the material is not only dried but is heated about to that temperature in passing through the dryer. The sand may be distributed in the dryer by operation of the distributing means 7 and falls by gravity between the steam pipes 5 onto the perforated bottom 8, its flow being regulated by screen 14 which prevents the same from passing therethrough until it is dry, it being understood that the sand will not flow freely through the meshes of the screen until its packing tendency is eliminated by the drying. The dried sand falls onto the perforated bottom 8 and passes through the perforations thereof onto the conveyer 9 which delivers it to the bottom of the elevator 15. When passing through the dryer and over the conveyer and in its elevation in the elevator the sand is subject to more or less agitation and this may contribute to some extent to the electrifying effect. The elevator delivers the sand over the screen 17, any coarse material being separated by the screen and the sand free from such coarse material passing through the screen and being delivered by chute 18 to the top of the separator 20 wherein the first separation takes place. In this connection I would state that it is impracticable to use a finer screen than 16 mesh for this purpose (with 20 to 80 mesh sand) for the reason that the electrification of the sand by operation of the heat at this stage is generally such as to cause it to adhere to the screen and to prevent it from passing through a fine mesh screen. In this separating operation the sand falls onto the plates 41 which in the case of materials such as above described may consist of glass, the dry sand being delivered to the uppermost plate at a temperature of about 190 to 195° F. and descending by gravity over the surface of this glass plate and then falling onto the next glass plate and descending in this manner over each plate and from plate to plate until the sand, or such part of the same as is not separated in the operation, passes out at the chute 19 at the bottom of the separator. Under the conditions stated I have found that part of the mica (biotite) present in the sand is repelled from the descending stream of sand and falls onto skimmers 44 which conduct it to discharge chute 45. Another part of the mica is carried around the lower edge of each glass plate and adheres to the back of the plate, whereas the quartz and feldspar tend to pass directly from each plate onto the next lower plate. The mica separated in this manner tends to pass upwardly to that part of the back of the glass plate which is about opposite the zone where the sand falls onto the top of the plate and adheres to such portion for a time but is eventually released and falls onto the skimmer plate 44 and is conducted by the same to a discharge chute 45, this separated mica being eventually discharged from the chute 45 through outlet 39 to any suitable receiving means. The skimmer plate in case of treatment of the material above referred to may consist of paper board, or similar material. The product which passes out at the discharge chute 19 from the first separator is or may be substantially free from mica but contains quartz and feldspar in substantially the original proportions, the amount of mica (½%) present being relatively small.

This product passes to the elevator 21 which delivers it to the feed chute 24 for the second separator or bank of separators 22. Said feed chute is preferably provided with the above described temperature control means 23 whereby the sand is reheated to about 175° F., and the hot dry sand then enters the separator or separators 22 and is brought successively in contact with the respective cylinders 51 therein. Said cylinders are preferably cooled by reason of their proximity to the temperature controlling means 59 which are in this case provided with cooling medium such as water at a suitable temperature, say 75° F., or expanding air or other cooling medium, and the sand just prior to contact with any cylinder may be subjected to a reheating operation by means of heating steam coils 58 at a temperature of say 170° F. The effect of such operation is to cause the sand at a relatively high temperature to be brought into contact with a separating surface, namely, a cylinder 51 at a relatively low temperature and the effect of this operation is to cause a constituent of the sand, namely, the quartz to adhere to and to be carried around by the cylinder and to eventually fall therefrom or be removed by the brushing means 63, and to be delivered by the discharge chutes 56 to the chutes 57; whereas another constituent, namely, the feldspar, is unaffected or relatively less affected and tends to fall from each cylinder onto the supply shelf 55 for the next lower cylinder and is then subjected to further successive separating actions on successive cylinders. It will be understood that the material will build up on each shelf 55 to the angle of repose and will thereafter run off of the shelf continually onto the next lower cylinder. The operation is preferably carried out in such manner that a small portion of quartz is removed from the sand by the operation of each cylinder whereas substantially all the feldspar along with the remaining portion of the quartz passes to the next lower cylinder, and a sufficient number of cylinders are provided to enable the desired relative separation by the time the same reaches the bottom of the separator so that relatively pure quartz passes through the chutes 56 and the discharge spouts 68 and elevator 25 to the bins 33, etc., and the sand relatively high in feldspar is discharged through spout 69 and elevator 26 to the storage bins 33' etc. The function of the classifying screens 29 is simply to separate or classify the purified quartz sand, and high feldspar sand respectively into grades of different fineness. It is preferable to cool the sand before screening, this being effected by the cooling means 38.

My process as above described is based on the fact that certain materials when subjected to temperature changes for example to heat, or to heating followed by cooling, are electrified, such electrification being due to properties of the materials themselves or to their properties relative to other materials with which they are in contact. I have found that the electrifying action is most marked in the case of certain minerals which are pyroelectric, that is to say have the property of becoming electrically polarized when the temperature is rapidly changed and such minerals are especially susceptible to separating action by my process. Thus certain crystallized minerals like quartz, tourmaline, boracite, calamine, etc., will develop simultaneous positive and negative charges of electricity on different parts of the same crystal when its temperature is suitably changed, and inasmuch as my process of separation operates most effectively, in some cases, on materials presenting marked differences in pyroelectric properties, it may be assumed that the separation is based in large part on pyroelectric action and the following explanation is offered on that basis. This process, so considered, consists of heating a mixture of comparatively finely divided particles like sand containing a pyroelectric mineral to a relatively low temperature, usually about 200° F. and allowing the mass to cool to a certain extent, whereby the before mentioned electric charges develop. The finer grains develop their charges sooner than the coarser but also lose their charges sooner. Moreover, the mineral being treated, may tend to lose electrification of one polarity more rapidly than that of the opposite polarity, and the sands or grains may thus become charged either negatively or positively. For example mica being flaky loses its heat rapidly when falling in air down an incline; the finer sand grains coming in contact with the mica first lose one of their charges to the mica and the opposite to the medium over which the mass travels or into the air or to another mineral present but very often, and in the case of one kind of sand I am separating, both the mica and another mineral (feldspar) become charged as of the same sign, and so repel each other. A very good separation, in fact we may say perfect, of biotite (black) mica from quartz and feldspar is accomplished by allowing the warm stream of sand to run over a series of stationary glass plates as above described, the paper board skimmer catching the mica that has been repelled from the stream of sand as well as the mica which has been attracted to the under side of the glass and subsequently becoming charged by contact with said plate, is repelled therefrom.

As indicating the variations in effect with different materials, it may be stated that when handling blown dune sand (known as the Del Monte white sand) the glass plates are plus (+) but when handling a somewhat coarser sand direct from a nearby beach (known as Fan Shell beach sand) the glass plates are minus (−). The building in which the apparatus and machinery are placed is − when handling Del Monte and + when handling Fan Shell sand. Both of these sands occur near Monterey, California.

The apparatus consisting of stationary glass plates and paper board skimmers is well adapted to separate out mica, vegetation, and various beach shells and spines from the sand. These impurities are not present in quantities of more than a few per cent of the total weight of sand, and the glass plates do not become too thickly crowded with mica to interfere with capacity as it would do if the mica consisted of 10% or more of the total, in which case a moving collector such as the above described revolving glass cylinder with felt scrapers has to be used. When using glass cylinders revolving slowly, the mica will jump to and stick to the glass and be scraped off. The cylinders having a chance to cool off on opposite side from the heated sand contact, the glass cylinder remains − on Del Monte sand and + on Fan Shell sand, and still there is no change in separation. However the glass cylinder is practically neutral and at times feebly the opposite at point of heat contact while diametrically opposite it is always − on Del Monte and + on Fan Shell sand. If the sand is made very hot and an extra thin glass cylinder is used and it is protected as much as possible from cold air it takes on the same sign as the stationary plates. The mass or amount to be heated often determines what sign of electricity it will be.

Mica separation can best be accomplished at either relatively high or low temperatures but not so well at intermediate ones. When first the pyroelectricity starts to develop in the sand (i. e. shortly after the cooling starts) or after it has developed and has lost part of its charge and the electricity starts to go back into heat again (as I have proven here that it does) the mica separation is easiest; at intermediate points it still separates out equally well, but more sand will go with it, which does not happen at the higher or lower temperatures. Consequently there may be cases where temperature regulation is desirable when making such separations, but as sand in the case referred to is very cheap, the loss of a half or even one ton per day into the mica product is of no economic importance.

It has not been possible to separate feldspar and quartz from each other until I discovered this pyro-electric method of separation. The economic importance of the separation of these two minerals is apparent from the following considerations. The mixture of quartz and feldspar sand such as usually occurs at Oceanside, California, assays about 92% silica. This is too low in silica for glass making and too high for pottery or sanitary ware. By subjecting this sand to pyroelectric separation treatment one can in one operation easily obtain one product 95 to 96% silica, suitable for glass making and another product about 88 to 89% silica suitable for porcelain and sanitary ware. By producing a larger quantity of glass sand than porcelain sand one can also produce a sand about 82 or 83% silica and correspondingly higher in feldspar and very desirable for foundry core sand, because it bakes better than purer silica sand. Such sand is very nearly half quartz (silica) and half feldspar (as feldspar itself usually contains 67% silica). To separate quartz from feldspar or the like, the heated sand is brought in contact with a cooling medium, such as the revolving roller above described. The roller will become charged with either plus or minus electricity depending upon what kind of sand is treated, what kind of material the roller is made of and the mass or thickness of such roller. Not all kinds of material give equally good results, but good separation on the same kind of sand can be accomplished both on a + and on a − medium. The corners of the crystals being charged on alternate corners + and −, one of the signs is lost to the cooling medium or roller and the particle then becomes charged with the remaining sign only and so is attracted to the cooling medium which has been charged by the particles themselves to the opposite sign. The action is instantaneous and continues as long as the cooling medium is kept at a lower temperature than the warm sand. In the operation above described it is the quartz and not the feldspar that becomes attached to the cooling medium or roller, and part of the adhering quartz falls off before reaching the scraper and the remainder is brushed off the roller by means of the felt scraper. The finest particles adhere to the first roller and so on down the line, a little coarser for each roller. Some feldspar is dragged in mechanically with the quartz, and the more pyroelectric the sand is the lower a product in quartz is obtained. Thus on Fan Shell sand which is very active and originally contains 82½% silica the first operation seldom gives over 90% silica, whereas, the Del Monte sand which is less active and assays 81½% $SiO_2$ will give a quartz assaying 94% $SiO_2$ in the first operation. The Fan Shell sand will separate out on almost any surface that does not present too great a mass, very good on thin iron or aluminum and fair on glass, but quite poor on copper and brass.

On Del Monte sand I have not succeeded in separating out quartz clean and well on any surface but celluloid, which absolutely refuses mica and feldspar and picks up quartz very readily. Other mediums will separate, but too slowly at a practicable heat (i. e. 195° or less). Sand which has been exposed and weathered for ages, is not as easily treated for quartz as sand direct out of the ocean where it is scoured clean.

On Fan Shell sand at a temperature of 140° to 145° and at a time when most of the pyroelectric charges have left the quartz, mica and feldspar both adhere to a glass roller, and feldspar, but not much mica will adhere for about one half second to porcelain. It can readily be seen that various separations can be accomplished, and the same separations need not necessarily have a certain routine, because quartz can be taken away from feldspar or feldspar from quartz, at a higher temperature quartz adhering, and at a lower temperature feldspar adhering to the same medium. Consequently heat or temperature control is necessary, of the sand to be treated as well as of the medium on which it is treated.

I have tried out experimentally both tourmaline and calamine of various sizes from one half inch to dust. The large pieces will not adhere to a thin medium like a tin can but stick well on a ¼ or ⅜ inch thick pipe. On the other hand a 30 mesh quartz sand will not stick on a ¼ inch pipe but very well on a tin can. I mention this simply to show that thickness of cooling or separating medium must bear a relation to the size of material treated to obtain best economical results. Calamine is so highly pyroelectric that the sticking action to a cooling medium is so instant and intense that if the same cooling medium is used as for sand the impurities are readily dragged with the calamine. Hence I have obtained better results with copper as a cooling medium for calamine than with glass or iron, whereas copper for the less active Del Monte sand is absolutely useless.

It will be understood that my process is applicable to the separation of any two or more materials in sufficiently finely divided condition and presenting the required differences in pyroelectric or other electrifying action under temperature changes to effect the separation. In the case of sand, the material is already sufficiently finely divided, but other materials may have to be crushed or ground or disintegrated before being subjected to the separating process. Furthermore the amount of heating, or of cooling after heating, will depend on the materials being treated, and the choice of the material comprising the separating plates, cylinders, or members on which the separating action takes place will also depend on the nature of the material being treated.

It will also be understood that the apparatus used in carrying out my process may vary widely from that shown in the drawing—In particular, other moving members may be used instead of cylinders, and any suitable scraping means therefor, either fixed or rotary brushes or strippers may be used. Also in some cases only the stationary apparatus, such as shown in Figs. 3 to 6 may be required, while in other cases it may be desirable to use only moving apparatus, for example of the type shown in Figs. 7 to 11, or of any other equivalent type. For example, I have found that Del Monte sand, above referred to, may be satisfactorily treated by operation of the stationary separator plate apparatus shown in Figs. 1 to 6. This sand contains 50% quartz, 48% feldspar, and 2% mica, lime, magnesium, vegetable matter, etc. This assays about 82% $SiO_2$. By treating this material in that part of the above described apparatus including the drier, the elevator, and the glass plate separator, the mica and vegetable matter may be substantially removed and a white sand obtained which is delivered by any suitable means for storage or shipping. Such a sand is suitable for any purpose consistent with its feldspar content, for example, for stucco work.

In carrying out the separating operation as above described it will be seen that the divided material is first dried and heated and then caused to pass in a descending stream over and from the separating surface or surfaces, in such manner that a constituent of the material is separated from the descending stream by the action of electrical forces developed in the described operations, and the constituent so separated is then delivered or discharged separately from the rest of said stream of descending material.

I claim:

1. The process of separation of constituents of a mixture of divided material which consists in subjecting said mixture to temperature changes in such manner as to produce by pyro-electric action electrification of a constituent of said mixture, and causing the mixture to pass into contact with and over a surface in such manner as to cause separation of a constituent of the mixture from the remainder thereof by the electrical action due to pyroelectrification of the materials, and in the absence of any electrification applied from an external generative apparatus.

2. The process of treating a mixture of divided materials containing constituents which are differently electrified by temperature changes which consists in subjecting such mixture to temperature changes in such manner as to produce by pyro-electric action different electrification of said constituents and then causing a constituent of the mixture to be separated from the remainder of the mixture by the action of such electrification alone.

3. The process of separating constituents of a mixture of materials of different pyro-electric properties which consists in subjecting such materials to temperature change to develop pyroelectric action in said materials and then causing a constituent of the mixture to be separated from the remainder of the mixture solely by electrical forces resulting from said pyroelectric action.

4. The process of separating constituents of a mixture, said constituents being responsive to temperature changes in such manner as to produce by pyro-electric action different electrifying action on said constituents, which consists in subjecting such mixture to temperature change in order to produce such electrifying action, causing the material to travel over and pass from a supporting surface in such manner that a constituent of the material is freed from the remainder of the material by electrical forces resulting solely from the electrification in the aforesaid electrifying action, and then separating the said constituent from the remainder of the mixture.

5. The process of treating a mixture of divided materials capable of being differently electrified by the pyro-electric action of temperature changes which consists in subjecting such a mixture of divided material to heat while the same is caused to travel over a supporting surface in such manner as to dry the material and cause the constituents thereof to be differently electrified, then causing the material to pass over and in contact with a supporting surface of such nature as to become electrified by reason of the contact with the said mixture, allowing the material to fall from the surface in such manner that a constituent thereof will separate from the rest of the mixture solely by the action of the electrical forces developed by reason of the different electrification of said constituent with respect to the rest of the mixture and with respect to the supporting surface, in such manner as to separate the constituent from the rest of the mixture.

6. The method of separating mica from sand containing the same which consists in heating and drying the mixture in such manner as to develop pyro-electric action therein, causing the mixture while still hot to pass over and in contact with a pyro-electrically affected supporting surface and to fall from said surface in such manner that the mica constituent of the sand will separate from the rest of the sand as the latter falls from said surface, and separately collecting the mica and the sand constituents so separated such separation of the mica from the sand resulting from the pyro-electric action without application of electrification from an external source.

7. The method of separating sand containing quartz and feldspar into a quartz constituent and a feldspar constituent which consists in heating and drying the mixture and then subjecting the mixture to cooling operation to partially cool to a temperature above atmospheric temperature but below the temperature to which it was originally heated in such manner as to produce pyro-electrification of the quartz constituent, then causing the quartz constituent to be separated from the rest of the sand solely by the action of electrification so developed and without electrification from an external source.

8. The method of separating sand containing quartz and feldspar into a constituent rich in quartz, and a constituent rich in feldspar which consists in subjecting the mixture to heating and drying operation, causing the mixture to come into contact with and pass over a surface which is at a lower temperature than the heated mixture, and is unconnected to any external source of electricity thereby developing electrification in said mixture and on said surface by pyro-electric action without the application of any externally generated electricity, causing the portion of the mixture which is relatively less subject to electrification to pass away from such surface by the action of gravity and another portion of the mixture which is relatively more subject to electrification to adhere to such surface, and causing said surface to move so as to cause the constituent adhering thereto by electrical action to be carried away from the rest of the material falling from said surface and to be thereby separated from the material so falling such separation being effected by the pyro-electrification of the material without the application of electrification from an external source and then removing from said surface the material adhering thereto so as to collect the same separately from the relatively less electrified material.

9. The method of separating constituents of a mixture of divided materials which consists in subjecting the mixture to drying and heating operations, and causing the mixture to pass in contact with a surface capable of developing pyro-electrification by reason of such contact, and of acting on a constituent of the mixture solely by reason of such electrification to separate such constituent from the rest of the mixture.

10. The method of separating constituents of a mixture of divided materials which consists in subjecting the mixture to drying, agitating, and heating operations, and causing the mixture to pass in contact with a surface capable of developing pyro-electrification by reason of such contact, and of acting on a constituent of the mixture by electrical forces developed solely by reason of such electrification to separate such constituent from the rest of the mixture.

In testimony whereof I have hereunto subscribed my name, this sixth day of November, 1925.

GUSTAV A. OVERSTROM.